United States Patent

Desmond

[15] 3,699,671
[45] Oct. 24, 1972

[54] EDUCATIONAL GAME APPARATUS
[72] Inventor: Donald James Desmond, 620 Highland Avenue, Woodstock, Ill. 60098
[22] Filed: Sept. 9, 1970
[21] Appl. No.: 70,234

[52] U.S. Cl. .................................. 35/48 R, 35/9 D
[51] Int. Cl. ........................................... G09b 7/06
[58] Field of Search .......................... 35/48, 9 C, 9 D

[56] References Cited

UNITED STATES PATENTS

| | | | |
|---|---|---|---|
| 2,656,617 | 10/1953 | Composto | 35/9 |
| 3,122,843 | 3/1964 | Levine et al. | 35/9 |
| 3,190,014 | 6/1965 | Rhodes | 35/48 |

Primary Examiner—Robert W. Michell
Assistant Examiner—J. H. Wolff
Attorney—John Cyril Malloy

[57] ABSTRACT

Educational apparatus of the question and answer type including a teacher station and a plurality of student stations with the switch means of the student and teacher stations being correspondingly identified by numbers, letters or other symbols. A teacher-student circuit connects like-identified switch means of the teacher station with the switch means of each student station. Each circuit provides means for indicating the correct answer of a multiple choice question, the answer to a mathematical problem or the like: The teacher closes a switch of a circuit representing the right answer to a question and a student, knowing the answer to the question, closes a switch of the same circuit, completing the circuit and emitting a signal indicating a correct answer is given. The apparatus also includes tally means for monitoring the performance of the individual students.

8 Claims, 5 Drawing Figures

INVENTOR.
DONALD JAMES DESMOND
BY John Cyril Malloy
ATTORNEY.

PATENTED OCT 24 1972 3,699,671

INVENTOR.
DONALD JAMES DESMOND
BY John Cyril Malloy
ATTORNEY.

EDUCATIONAL GAME APPARATUS

BACKGROUND OF THE INVENTION

1. Field of the Invention

The invention relates to educational apparatus generally and particularly relates to such apparatus having electric circuitry for indicating a right or wrong answer to a problem or question and includes means for registering correct answers.

2. Description of the Prior Art

With the tremendous increase in student enrollment resulting in overcrowded classroom conditions and scarcity of teachers or instructors, there is a very significant trend toward the use of electronic teaching aids for classroom instruction. The prior art teaching apparatus typically is of complicated design utilizing complex electronic circuitry; such apparatus is expensive in first cost outlay and also in operation and maintenance. U.S. Pat. Nos. 3,461,571 and 3,186,109 are representative of prior art educational apparatus of complicated design. Certain prior art game apparatus is also ineffective in that it fails to hold the interest of the participating students and during the use or application of the apparatus. Many students and teachers feel that the electronic educational aid devices are too mechanical in procedure and there is not enough rapport between the student and instructor. The prior art apparatus also usually does not include a convenient way for keeping score or monitoring the performance of the individual students. Unless the student responses are recorded by the student or instructor, there is not a convenient way for scoring or tallying the score of the students. This also causes students to be less attentive and interested in the classroom procedure and consequently the devices are typically not as effective as the conventional teacher-student classroom procedure.

SUMMARY OF THE INVENTION

The instant invention obviates many of the above-mentioned objectionable features and provides educational apparatus of relatively simply design, admitting of economical construction and use. The instant invention accentuates the game or challenge aspect of a teaching environment; the apparatus of the instant invention provides score-keeping means and brings into play a competitive spirit of fun and activity in the teaching process. There is more rapport between the teacher and student than is found in the typical prior art teaching apparatus. There is less of a mechanical aspect in the teaching procedure and the interest of the student is maintained in the competitive activity during a classroom experience. Also, in the utilization of the educational apparatus of the instant invention, the individual students are responsible for scoring or recording his responses to questions or problems presented by the teacher. Utilizing the honor system, permitting the students to each record his own responses, is also useful for developing traits of initiative and honesty which is so desirable in the classroom environment.

DESCRIPTION OF THE PREFERRED EMBODIMENTS

Figure 1:
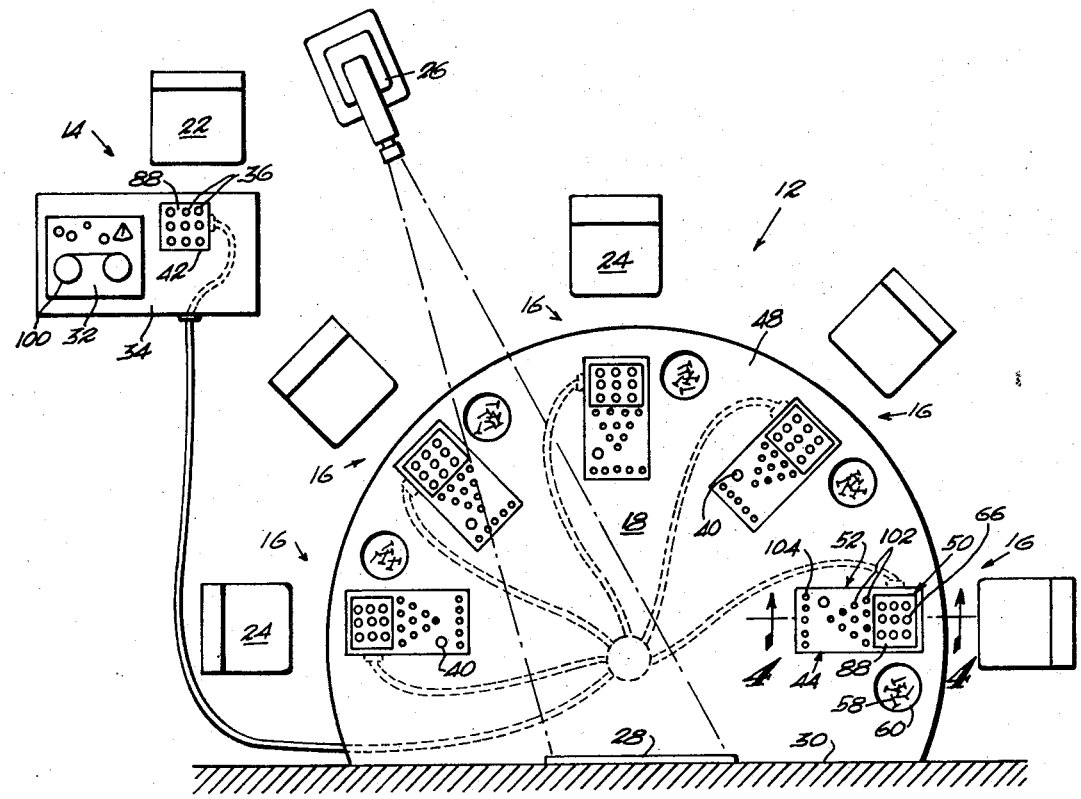
FIG. 1 is a plan view of a preferred embodiment of the educational game apparatus of the instant invention, but for brevity and convenience in description, illustrates apparatus suitable for accommodating only five students.

A preferred embodiment of the educational game apparatus (FIGS. 1–4) is indicated by reference character 12 and includes a teacher station 14, a plurality of student stations 16 which may be arranged around a table 18, and includes electric circuit means 20 (see FIG. 2) connecting the teacher station 14 with each student station 16. A chair 22 is provided for the teacher and chairs 24 for the students. A slide projector 26 also preferably is provided for projecting information on a board or screen 28 which may be supported on a wall 30. If desired, a tape recorder-player 32 may also be supported on a table 34 of the teacher station 14, providing additional means for communicating educational information to a student group.

The electric circuitry of the apparatus (FIGS. 2 and 3) includes a series of circuits generally designated respectively by the reference character suffix $b$, $c$, $d$ and $e$ and with each circuit including a teacher switch and a series of student switch means. For example, the circuit designated by the suffix letter b will include a teacher switch 36$b$ and the student switches 38$bX$, 38$bY$ and 38$bZ$. The conductor means of each circuit connects each student switch means respectively 38$bX$, 38$bY$, 38$bZ$ in series resistance relation to the teacher switch 36$b$ and each student switch means to each other student switch means in parallel resistance relation (see particularly FIG. 4). Student alert means preferably in the form of colored incandescent lamps 40$bX$, 40$bY$ and 40$bZ$ provide visual observation means for informing students respectively of the stations X, Y and Z of a correct response to a question or problem.

Each of the circuits designated generally $b$, $c$, $d$ and $e$ represent a response that may be made by a student to a question presented by a teacher seated in the chair 22. The series of four circuits suffix-designated $b$, $c$, $d$, and $e$ represent four questions or problems, and responses which may be made by the students.

The teacher switches 36$b$, 36$c$, 36$d$, 36$e$ each are preferably of the push button, normally open type, and preferably are mounted in perpendicular rows and columns, in a switch panel 42 supported on the table 34 of the teacher station. For purposes of clarity, only four switches 36 are illustrated in the schematic drawing FIG. 2, as compared with a showing of nine switches 36 in FIG. 1; the same is true in comparing the number of student switches 38 in FIGS. 1 and 2.

Figure 2:
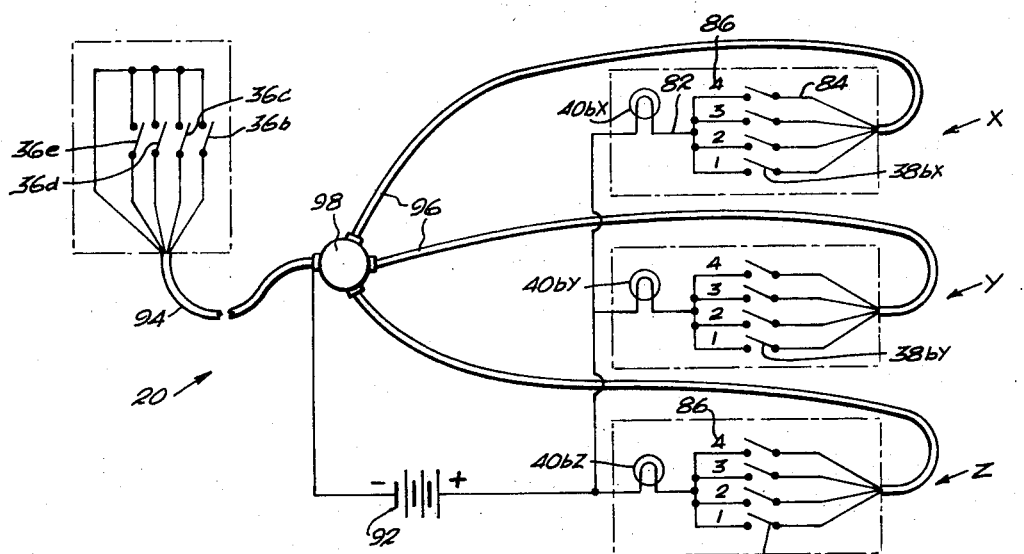
FIGS. 2 and 3 are schematic showings of the electric circuitry of the instant invention, shown in an abreviated form as compared with FIG. 1, and for accommodating only three students.

Each of the student stations 16 are alike and the following description of the lower right-hand station shown in FIG. 1 will suffice also as a description for the remaining student stations:

The student stations 16 preferably includes a rectangular work board 44 supported in an upwardly stepped rectangular opening 46 formed in the top board 48 of the student table structure. The rectangular work board 44 preferably includes a switch section 50 and a score-keeping section 52. The student switch means, generally indicated 38, includes a plurality of finger pin elements 58 which may be collected in a cup-like recess 60 formed in the table top structure 48 at each student station. Each finger pin element 58 preferably is formed with a slender cylindrical splint portion 62 and a broad head portion 64. The finger pin elements may be formed of plastic material or other material non-conductive of an electric current. A plurality of guide holes 66, preferably arranged in perpendicular rows and columns are formed in the work board 44, and in number corresponding with the number of teacher switch elements 36 of the teacher station 14. Each guide hole 66 is adapted to receive a finger pin element 58 selected from a recess 60; a finger pin 58 is adapted to be inserted in a selected guide hole 66, and upon bidirectional axial movement of the pin, to open and close contacts 68, 70 arranged underneath the work board 44 of the student station.

Figure 3:
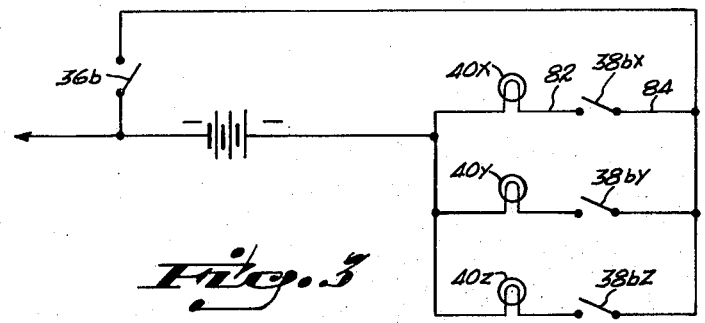
Figure 4:
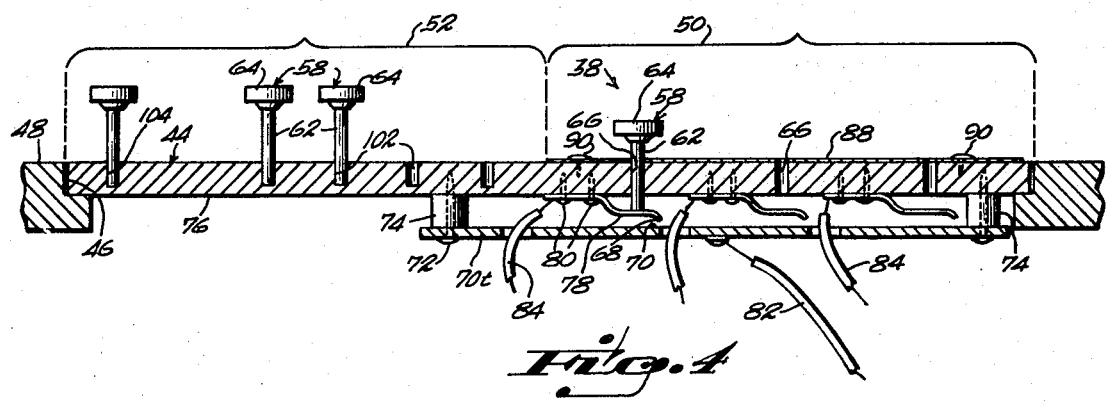
FIG. 4 is a vertical plane sectional view of one of the student stations of the apparatus, taken as on the line 4—4 of FIG. 1.

The contacts 68, 70 preferably are of configuration shown in FIG. 3, with the contact 70 being formed by a thin plate 70t supported by screw and spacer means 72, 74 in parallel spaced arrangement subjacently of the undersurface 76 of the workboard 44. The negative potential contact 68 of each switch means 38 preferably is formed by the distal extremity of a spring leaf 78 fixedly secured to the undersurface 76 of the workboard 44 by nail-like fasteners 80. The leaf spring 78 normally is stressed in a disposition normally clearing the distal end contact portion 68 thereof from the upper surface of the contact plate 70t. Inserting the splint portion 62 of a finger pin 58 in a selected guide hole 66 and finger-pressing the pin inwardly or downwardly, moves the leaf spring 78 downwardly, and the contact portion 68 against the upper surface of the plate 70, closing the contacts of a respective switch means 38, and if the teacher switch 36 of that respective circuit is closed, completing a circuit through the respective conductors 82, 84 and lighting a respective lamp 40.

The switch panel 42 of the teacher station 14 and the switch section 50 of the workboard 44 of each student section 16 preferably is provided with prominent indicia identifying each of the teacher switches 36 and the guide holes 66 of the student switch means 38. The identifying indicia of a same circuit is provided with corresponding words, symbols or the like and the identifying indicia of one circuit is different from the identifying indicia of each other circuit of the apparatus. The indicia may be in simplified form, providing means for numbering consecutively the switches 38 and guide holes 66, and may be in the form of indicia 86 (see FIG. 2) and in the form of consecutive arabic numerals 1, 2, 3, 4 as schematically shown in the drawing. The indicia 86 may be formed on paper sheet means 88 (FIG. 4) secured by thumbtack means 90 respectively on the upper face surface of the teacher switch panel 42 and the upper surface of the switch section 50 of the workboard 44 of each student station.

The educational apparatus may be energized from main line electricity, through transformer means or may be energized by battery means 92. The electric leads conducting current in the apparatus preferably are bundled together in multilead cables 94, 96 connected together through junction box means 98 supported on the underside of the top 48 of the student table structure.

In using the educational apparatus, a teacher may orally call out a question or may photographically project a program or a series of questions onto the screen 28 by the slide projector 26. Or optionally, the teacher may present the question material by writing on blackboard means (not shown), or by playing a pre-recorded tape 100 through the recorder-player instrument 32. If the teacher orally calls out the questions, the students will concurrently answer each questions in consecutive order. Should the questions be written on a blackboard or projected on the screen 28 by the projector 26, each student may answer the questions according to his own rate and knowledge of the questions. The questions or instruction material may be in true-false form, multiple choice questions, or may be programmed for solving simple mathematical problems. The indicia 86 formed on the paper sheet means 88 of the teacher station and each of the student stations may be of selected form and may optionally be numerically arranged, representing multiple choice questions, or may be provided with simple symbols or graphic illustrations for primary grade work or for representing numerical values of simple arithmetic problems.

For purposes of clarity in description in describing the use of the apparatus, the questions will be considered as being multiple choice, and the teacher switch means 36 and the guide holes 66 of each of the student stations will be demarcated numerically in consecutive order representing the several choices of answers for each question. As shown in FIG. 1, a multiple choice question may have as many as nine probable answers to the question. After a question is put before the students either orally or through the projector means, the teacher will close the switch 36 of the circuit representing the correct answer to the problem and hold the switch in closed condition while the students answer. The teacher in effect is half-closing the circuit of the correct answer. A student knowing the right multiple choice selection to answer the question, removes a finger pin 58 from depression 60 and inserts the splint portion 62 thereof in the guide hole 66 representing the answer of the multiple choice selection. A student making a correct selection, closes the appropriate contacts 68, 70 thereby completing the correct-answer circuit, lighting lamp 40, thereby informing the student of a correct answer given for that question. The student may then remove the finger pin 58 and insert it in a primary socket aperture 102 formed in the score-keeping section 52 of the workboard 44 of the student station. As the succeeding questions are answered, with each correct answer, the finger pin is removed from the correct-answer guide hole 66 and inserted in a primary socket aperture 102. If a student makes a wrong choice, and the lamp 40 of his station is not energized, the student will not insert the pin in the socket 102, but may use the pin for answering a following question. An infinite number of multiple choice questions may be answered in this fashion, limited only substantially by the presentation of questions and by the number of pins 58 available at each student station. A secondary set of sockets 104 also preferably is provided for use in tallying the score of each student. If desired, a pin 58 inserted in a single socket 104 may represent the same value as when all of the sockets 102 are filled by a plurality of finger pins; when all of the sockets 102 are filled, the finger pins may all be removed and a single pin inserted in one of the sockets 104. In this manner, the correct answers of a large number of multiple choice questions may be recorded. If desired, the pins 58 may be colored and composed of several color groups, and the recess 60 of each student station may contain pins of different color. In this manner, utilizing different colored pins, right and wrong answers may be recorded and also questions pertaining to various subject matter may be differentiated.

Figure 5:
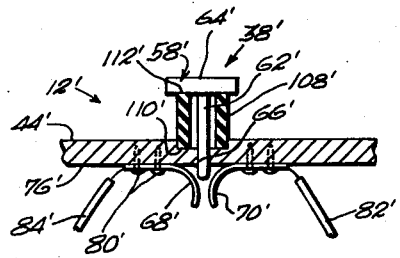
FIG. 5 represents a modification of the apparatus.

The embodiment 12', illustrated in a fragmentary showing in FIG. 5, differs substantially from the above-described embodiment substantially only in the configuration of the switch means 38' of each student station: Subjacently of each guide hole 66' is arranged a contact pair 68', 70' spaced a slight distance apart and arranged symmetrically of the axis of a respective guide hole. The contacts 68', 70' may be in flat leaf form and fixedly secured by pin fasteners 80' on the undersurface 76' of a student workboard 44'. Each finger pin element 58' of the embodiment 12' is provided with a splint portion 62' formed of material conductive of electric current. Inserting a finger pin 58' in a guide hole 66' brings the distal end of the splint portion 62' between the contacts 68', 70', closing the circuit of the conductors 82', 84'; while the instructor maintains his switch closed of a correct answer circuit, a student, inserting a finger pin 58' in the correct guide hole 66', closes the circuit, energizing the lamp of that circuit, and informing the student of a correct answer.

The splint portion 62' of a finger pin 58' may be of slender cylindrical form providing a free but frictional fit in a guide hole 66', and in such an embodiment, the finger pin may be axially positioned in engagement or disengagement with the contacts 68', 70' and respectively maintained in an closed or open position. In lieu of such an arrangement, the splint portion 62' of a finger pin 58' may be configured for loose fit in a guide hole 66' and an annular resilient member 108' may be utilized for outwardly retracting the finger pin and normally maintaining the switch means 38' in an open circuit condition; the resilient member 108' may be permanently adhesively secured in an annular recess 110' formed in a workboard 44'. The finger pin head portion 64' engaging the outer annular rim 112' of the resilient member 108' maintains the distal end of the finger pin splint portion 62' disengaged from the contacts 68', 70' and the switch means in an open circuit condition. Considering that the contacts 68', 70' are of a correct-answer circuit, one-half closed selectively by the teacher through actuation of the teacher switch means 36' (not shown), the insertion of a finger pin 58' between the contacts 68', 70' closes the circuit and energizes the lamp informing the student of a correct answer. A finger pin 58' may be removed from a resilient member 108' and inserting in the score-keeping socket means for tallying a students score and in the same manner outlined in the previously described embodiment.

While the instant invention is shown and described in embodiments presently conceived as being preferred, various changes not intrinsic in form and function may be made without departing from the spirit and scope of invention.

What is claimed is:

1. Educational game apparatus comprising a plurality of student stations, a teacher station, a series of teacher-student circuit means, each of said circuit means including an on-off teacher switch arranged at the teacher station and a plurality of student switch means arranged each switch means at a respective station of said plurality of student stations, conductor means connecting each student switch means to said teacher switch means in series resistance relation and each student switch means to each other student switch means in parallel resistance relation, each student switch means of each teacher-student circuit including a positive and a negative potential contact and finger pin means for opening and closing said contacts including a discrete finger pin element and guide hole means guidingly constraining said finger pin element in bidirectional axial movement between inward contact closed and outward contact open positions, and including student alert means including a plurality of signal components, each component being connected in series resistance relation with said teacher switch and student switch means of a respective student stations and in parallel resistance relation to each other signal component of that circuit; a signal component for each student station being located in a place permitting an emitted signal to be received by the student of that station, said finger pin means of said student switch means of each student station includes a plurality of removable finger pin elements of indefinite number by at least in number more than the number of teacher-student circuits; a student selects a finger pin element and inserts said pin element in a guide hole means of a student switch means in closing the circuit of that switch means and score-keeping socket means for receiving said removable finger pin elements for monitoring the performance at a student station.

2. Educational game apparatus as set forth in claim 1 wherein the student alert means is of visual observation type and wherein each signal component is of light generating form located at a student station and operative in emitting a light signal to be received by the student of that station.

3. Educational game apparatus as set forth in claim 2 wherein each student switch means of each student section includes spring means urging a respective finger pin element of each student switch means to an outward open circuit disposition.

4. Educational game apparatus as set forth in claim 3 wherein said positive potential contact of each student switch means is stationarily supported in axially spaced arrangement relative to said guide hole means thereof and wherein said spring means includes a spring leaf cantilever supported between said guide hole means and said positive potential contact, defining said negative potential contact on the distal end of said spring leaf, sprung normally in an open circuit disposition and with the distal portion of said spring leaf being normally arranged in coaxial arrangement with said hole means, permitting a finger pin element inserted in said guide hole means to engage the spring leaf with the distal end of the finger pin for closing the contacts of said switch means by axial inward movement of said finger pin and upon releasing the pin the contacts open.

5. Educational game apparatus as set forth in claim 3 wherein said positive and negative potential contacts of each student switch means are spaced apart a slight distance and arranged generally symmetrically of said guide hole means of said student switch means, and wherein at least the distal end of each respective finger pin element is formed of electric current conductive material, whereupon insertion of a finger pin in the guide hole means of a student switch brings the distal end of the finger pin between the contacts and closes the circuit of that switch means and retraction of the finger pin element opens that circuit.

6. Educational game apparatus as set forth in claim 2 wherein the teacher switch and each student switch means of a teacher-student circuit is provided with like indicia correspondingly identifying the teacher and student switch means of the circuit and wherein the switch means of each circuit is of different identifying indicia than the identifying indicia of each other circuit of the apparatus.

7. Educational game apparatus as set forth in claim 6 wherein the score-keeping socket means includes a primary and a secondary set of sockets with one socket of the secondary socket set representing a value equal to all the sockets of the primary socket set.

8. Educational game apparatus as set forth in claim 7 wherein the finger pin means of each student station consists of several groups of pins, each group being colored different from each other group, and with the finger pin means of one student station consisting of color groupings of pins corresponding with the color groupings of each other student station.

* * * * *